July 18, 1933.  B. C. EBERHARD  1,918,524

RESILIENT CONTAINER AND METHOD OF SEALING IT

Original Filed March 20, 1929

Inventor

Boyd C. Eberhard

By Bee + Bush

Attorneys

Patented July 18, 1933

1,918,524

UNITED STATES PATENT OFFICE

BOYD C. EBERHARD, OF AKRON, OHIO, ASSIGNOR TO THE GOODYEAR TIRE & RUBBER COMPANY, OF AKRON, OHIO, A CORPORATION OF OHIO

RESILIENT CONTAINER AND METHOD OF SEALING IT

Continuation of application Serial No. 348,451, filed March 20, 1929. This application filed June 21, 1930. Serial No. 462,855.

This invention relates to air containers which are formed of rubber, and it has particular relation to pneumatic articles having valve structures secured in the walls thereof, and to methods of securing such structures in position. This application is a continuation of my application Serial No. 348,451, filed March 20, 1929.

The object of the invention is to provide a fluid tight seal between the base portion of air valves or other metallic bodies and the walls of rubber air containers through which they extend.

Heretofore, much difficulty has been experienced in obtaining a permanent fluid-tight seal about the metallic bodies which extended through the walls of such flexible containers as airbags employed in the vulcanization of tires and inner tubes used to inflate pneumatic tires. This was particularly true in cases where the containers were subjected to such relatively high temperatures and pressures as those encountered in the use of inner tubes for truck tires or in airbags employed in the vulcanization of pneumatic tires. Heat generated about the metallic body apparently softened and weakened even the vulcanized rubber, thus causing it to crack or tear or to tend to spread out under the pressure created by the clamping action of the base portion of the valve and the coacting bridge plate, thereby permitting fluid to escape. When this occurred it became necessary to tighten up the bridge plate. The latter operation could only be accomplished after removal of the tube from the wheel, and hence involved considerable labor.

One feature of the invention involves the provision of a patch of very slow curing, tacky semi-plastic, semi-elastic or dough-like compound between the base of the metallic body and the walls of the finished vulcanized container, whereby to obtain a permanent seal therebetween which is not destroyed by the effects of heat upon the container, either during or after its vulcanization.

Figure 1:
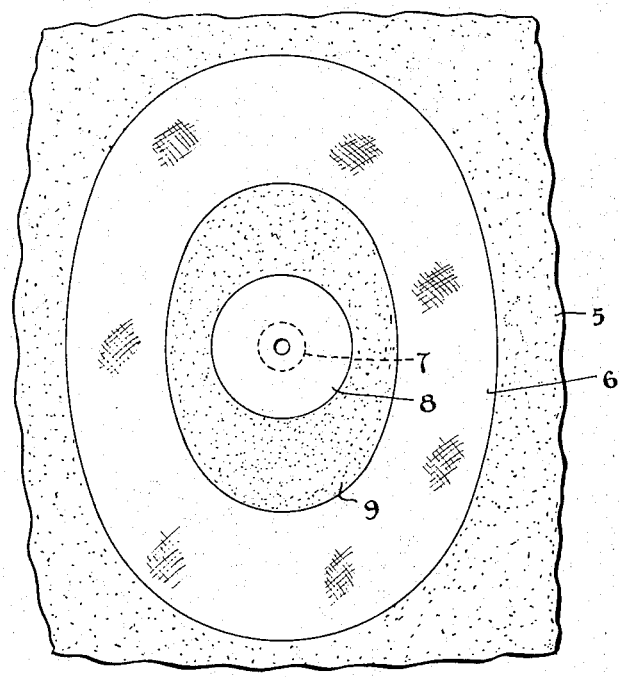
Figure 2:
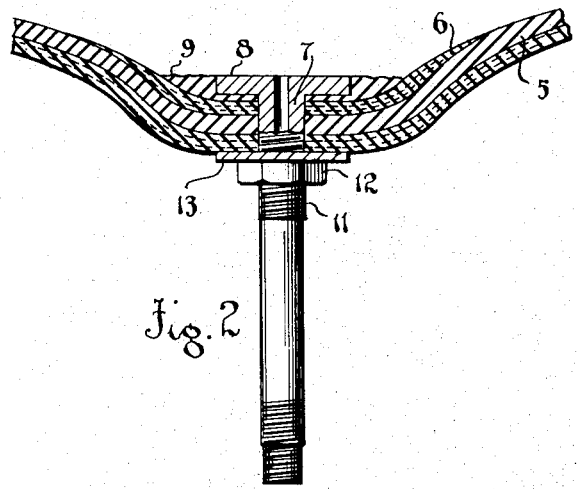

For a better understanding of the invention, reference may now be had to the accompanying drawing, forming a part of the specification, of which:

Fig. 1 is a fragmentary plan view of a portion of an inner tube wall embodying a valve structure which is sealed according to the invention; and Fig. 2 is a view partially in cross-section and partially in elevation of the embodiment of the invention disclosed in Fig. 1.

In practicing the invention, an inner tube or similar container 5, composed entirely of rubber, or at least comprising rubberized material, either with or without a valve patch 6, is pierced to receive the inner portion of a valve stem 7 of conventional design. It is to be understood that the walls of the container, apart from the patch 6, in the finished article, are composed of vulcanized, non-plastic, non-tacky material which, in airbags and inner tubes, is relatively elastic and flexible. In order to secure the valve in position, the inner end of the valve stem is formed with a flanged base 8, which is embedded within a patch of slow curing semi-plastic, semi-elastic or dough-like gum material 9, that adheres to the inner wall of the container. This material 9 is applied before the container is vulcanized and remains in a tacky, dough-like condition even after being subjected to the heat for vulcanizing the container. Thus the vulcanization of the container provides a firm bond between it and the dough-like patch in the finished article. The stem 7 adjacent to the exterior side of the wall of the tube 5 has a screw-threaded portion 11 to receive a clamping nut 12 which presses upon a washer or bridge plate 13, thereby securely clamping the portions of the tube wall adjacent the valve opening.

The composition of the patch 9 may vary within relatively wide limits, although it is essential that it retain its elasticity and plasticity throughout its normal life. In actual practice it has been found that a rubber compound containing from 20 to 40 percent of rubber and 40 to 60 percent of zinc oxide, together with a small amount of sulphur (1 to 5 per cent) is satisfactory. The following is a specific example of a formula of a compound which insures excellent results:

| | Parts |
|---|---|
| Rubber | 33 |
| Zinc oxide | 60 |
| Sulphur | 2 |
| Magnesium oxide | 5 |

Material prepared in accordance with this formula is spread while green or uncured and is partially cured or semi-cured by the heat required for vulcanizing the tube or other article to which the invention is applied.

The relatively large proportion of pigment employed in this compound insures a material which does not flow under the temperatures ordinarily encountered in such rubber containers as inner tubes for truck tires and airbags. Furthermore, the material is extremely slow curing and never loses its semi-plastic, semi-elastic dough-like character throughout its normal period of use. In the claims I have referred to this material as being permanently semi-plastic, semi-elastic, tacky or dough-like in character and it will be understood that the term "permanently" means throughout the normal period of use of the material. It is also of a sufficiently tacky nature to adhere not only to the inner surface of the containers in which it is employed, but it also tends to adhere to the metal itself. Because of its plasticity, elasticity and tackiness, the compound readily yields to deforming stresses which are set up when the wall of the container tends to diminish in thickness, or to tear about the valve stem. Therefore, a perfect seal is maintained about the latter at all times, even though the rubber in the wall of the tube may tend to flow away from the valve seat.

The composition of the tube wall of course may be varied so long as it has sufficient tensile strength and firmness for the purpose for which it is designed. The following is a specific example of a material applicable for the manufacture of vehicle tire inner tubes:

| | Parts |
|---|---|
| Smoked sheet rubber | 100 |
| Zinc oxide | 92.5 |
| Carbon black | .6 |
| Stearic acid | .7 |
| Sulphur | 3.5 |
| Diphenylguanidine | .7 |
| Phenyl beta naphthylamine | 5 |

In the above formula, the relative proportions of the several ingredients may be varied to meet specific requirements. Also, certain of the materials such as the activator, stearic acid, the accelerator, diphenylguanidine and the antioxidant phenyl beta naphthylamine may be replaced by other substances of like character. Conventional methods are employed in curing or vulcanizing tubes or airbags prepared according to this specification.

Although the invention has been specifically described as applied to the valve stems of inner tubes, it is to be understood that it is capable of much wider application than that. The soft plastic material disclosed may be used for sealing about the bases of the valves of airbags employed in the vulcanization of tires, or it may be employed about the couplings of hose where the latter are subjected to relatively high heats and fluid pressures.

In the preceding description, the term "non-plastic" is employed to indicate a material which at normal atmospheric temperatures does not tend to flow and which does not permanently retain ordinary deformations to which it may be subjected in use.

Although I have disclosed only the preferred forms which the invention may assume, it will be apparent to those skilled in the art that the invention is not so limited but that various modifications may be made therein without departing from the spirit of the invention or from the scope of the appended claims.

What I claim is:

1. A non-plastic rubber container for fluid under pressure having a valve stem extending therethrough, a valve seat portion upon the inner end of the valve stem, and a patch of permanently semi-plastic, semi-elastic, tacky material disposed between the seat portion and the walls of the container.

2. A rubber container for fluid under compression having a valve stem extending therethrough, a seat portion upon the inner end of the valve, and a patch of slow curing, semi-plastic, dough-like rubber compound consisting of 20 to 40 percent rubber, 40 to 60 percent zinc oxide and 1 to 5 percent sulphur disposed between the seat portion and the inner side of the wall of the container.

3. A non-plastic rubber inner tube for vehicle tires having a valve stem extending therethrough, a seat portion upon the inner end of the valve, and a patch of permanently semi-plastic, tacky, dough-like material disposed between the face of the seat portion and the inner side of the wall of the tube.

4. A composite body comprising two portions of metal, a sheet of rubber disposed between and held under compression by the bodies, and a patch of permanently semi-plastic, semi-elastic, dough-like rubber compound disposed between one of the portions and the sheet.

5. A composite body comprising a portion of cured, elastic non-plastic rubber clamped between two portions of metal, the points of contact between the rubber and the metal being sealed by the application of coatings of semi-plastic, semi-elastic, tacky dough-like material which adheres to the rubber and to the metal, and which permanently retains the above indicated characteristics under the ordinary conditions to which the material is subjected.

6. A fluid-tight container comprising a wall of vulcanized relatively flexible rubber, a metallic plate disposed about an opening in the wall, and a patch of permanently semi-plastic substantially non-vulcanizable dough-like rubber compound disposed between the metallic plate and the adjacent portions of the walls of the container.

BOYD C. EBERHARD.